United States Patent
Kim et al.

(10) Patent No.: US 11,111,077 B2
(45) Date of Patent: Sep. 7, 2021

(54) LOGISTICS MOVEMENT AUTOMATION SYSTEM AND METHOD

(71) Applicant: CJ LOGISTICS CORPORATION, Seoul (KR)

(72) Inventors: Seung Mo Kim, Seoul (KR); Jae Sook Jung, Goyang-si (KR); Koo Po Kwon, Yongin-si (KR); Tae Young Chung, Seoul (KR)

(73) Assignee: CJ LOGISTICS CORPORATION, Seoul (KR)

( * ) Notice: Subject to any disclaimer, the term of this patent is extended or adjusted under 35 U.S.C. 154(b) by 155 days.

(21) Appl. No.: 16/478,513

(22) PCT Filed: Jan. 16, 2018

(86) PCT No.: PCT/KR2018/000706
§ 371 (c)(1),
(2) Date: Jul. 17, 2019

(87) PCT Pub. No.: WO2018/135824
PCT Pub. Date: Jul. 26, 2018

(65) Prior Publication Data
US 2019/0389658 A1    Dec. 26, 2019

(30) Foreign Application Priority Data

Jan. 17, 2017    (KR) ........................ 10-2017-0008248

(51) Int. Cl.
*B65G 1/137*    (2006.01)
*B65G 13/06*    (2006.01)
(Continued)

(52) U.S. Cl.
CPC ......... *B65G 1/1373* (2013.01); *B65G 1/1371* (2013.01); *B65G 13/06* (2013.01); *B65G 43/08* (2013.01); *G06Q 10/04* (2013.01)

(58) Field of Classification Search
CPC combination set(s) only.
See application file for complete search history.

(56) References Cited

U.S. PATENT DOCUMENTS

| 2010/0070070 A1* | 3/2010 | Stemmle | B65G 1/0457 700/215 |
| 2011/0081222 A1* | 4/2011 | Lin | B65G 1/0428 414/273 |

(Continued)

FOREIGN PATENT DOCUMENTS

| JP | H07-330143 A | 12/1995 |
| JP | 2001-192116 A | 7/2001 |

(Continued)

OTHER PUBLICATIONS

International Search Report dated Apr. 20, 2018, corresponding to International Application No. PCT/KR2018/000706 citing the above reference(s).

*Primary Examiner* — Kyle O Logan
(74) *Attorney, Agent, or Firm* — Hauptman Ham, LLP

(57) ABSTRACT

Disclosed are a logistics movement automation system and method in which transfer means automation and moving path optimization have been implemented in association with the existing logistics automation system for integrated cargo warehousing and delivery. When unit cargoes are piled up from an association system outside or within a warehouse to an association transfer unit, a recognition unit generates recognition information by recognizing the unit cargoes and transfers the recognition information to a control unit. The control unit generates a moving path based on the received recognition information using an optimization algorithm and moves, arranges, distributes or flat keeps the unit cargoes along the generated moving path through at least one of the
(Continued)

association transfer unit, the distribution transfer unit and the plate unit for warehousing or delivery.

13 Claims, 3 Drawing Sheets

(51) Int. Cl.
*B65G 43/08* (2006.01)
*G06Q 10/04* (2012.01)

(56) References Cited

U.S. PATENT DOCUMENTS

2011/0106295 A1* 5/2011 Miranda .............. B65G 1/1378
 700/216
2016/0297610 A1* 10/2016 Grosse .................... B60M 1/34
2019/0144163 A1* 5/2019 Lim ..................... B65D 19/385
 108/53.5

FOREIGN PATENT DOCUMENTS

| JP | 2008-63099 A | 3/2008 |
| KR | 2010-0078064 A | 7/2010 |
| KR | 10-1255076 B1 | 4/2013 |

* cited by examiner

LOGISTICS MOVEMENT AUTOMATION SYSTEM AND METHOD

CROSS-REFERENCE TO RELATED APPLICATION

The present application is a national stage filing under 35 U.S.C § 371 of PCT application number PCT/KR2018/000706 filed on Jan. 16, 2018 which is based upon and claims the benefit of priority to Korean Patent Application No. 10-2017-0008248, filed on Jan. 17, 2017, in the Korean Intellectual Property Office, which is incorporated herein in its entirety by reference.

TECHNICAL FIELD

The present invention relates to a logistics movement automation system and method and, more particularly, to a logistics movement automation system and method, wherein unit cargoes are loaded from an association system outside or within a warehouse to an association transfer unit, a recognition unit recognizes the unit cargoes, generates recognition information, and transfers the recognition information to a control unit, the control unit generates a moving path based on the received recognition information using an optimization algorithm and warehouses or delivers the unit cargoes by moving, arranging, distributing or flat keeping the unit cargoes through at least one of the association transfer unit, a distribution transfer unit and a plate unit along the generated moving path.

BACKGROUND ART

A conventional warehouse system is problematic in that it can partially process cargoes because the system chiefly has an object of moving cargoes in a point-to-point manner in association with an automated storage/retrieval system (AS/AR) or a loading/uploading automation system or branching cargoes in association with a distribution automation system.

Furthermore, there is a problem in that productivity is reduced and personal expenses are increases because a warehouse area in which a system has not been configured depends on manpower.

Accordingly, there is an increasing demand for association with the existing logistics automation system, transfer means automation, and moving path optimization using an optimization algorithm for integrated cargo warehousing and delivery.

The present invention relates to a logistics movement automation system and method capable of arranging, moving or flat keeping cargoes efficiently and comprehensively as described above.

DISCLOSURE

Technical Problem

An object of the present invention is to provide integrated unit cargo warehousing or delivery in association with the existing system within a warehouse. Furthermore, an object of the present invention is to provide transfer automation that replaces a forklift and unit cargo transfer means within a warehouse for cargo warehousing or delivery.

Technical objects to be achieved by the present invention are not limited to the aforementioned objects, and those skilled in the art to which the present invention pertains may evidently understand other technological objects from the following description.

Technical Solution

A logistics movement automation system according to an embodiment of the present invention includes an association transfer unit configured to transfer unit cargoes piled up for warehousing or delivery to a distribution transfer unit along a moving path generated by a control unit, a recognition unit configured to recognize the unit cargoes piled up on the association transfer unit and transfer the recognition information to the control unit, the control unit configured to receive the recognition information from the recognition unit and generate and control the unit cargo moving path, a plate unit configured to arrange, move or flat keep the unit cargoes on the plate unit along the moving path generated by the control unit, and a distribution transfer unit configured to rotatably move or straightly move the unit cargoes received from the association transfer unit to the plate unit or the association transfer unit.

The logistics movement automation system may further include a horizontal moving unit configured to horizontally move the plate unit.

The control unit generates the moving path using an optimization algorithm. Furthermore, the control unit controls the warehousing and delivery of the unit cargoes in parallel simultaneously.

The plate unit is designed in the form of a module having fastening structures on sides and capable of being extended by additionally connecting the module.

The distribution transfer unit and the association transfer unit may be located on both sides of the plate unit in order to receive the unit cargoes from the plate unit.

A movement automation method for cargo warehousing or delivery according to an embodiment of the present invention includes piling up unit cargoes on an association transfer unit, generating, by a recognition unit, recognition information by recognizing the unit cargoes, generating, by a control unit, a moving path using the recognition information received from the recognition unit, moving the unit cargoes along the moving path generated by the control unit through at least one of a plate unit, a distribution transfer unit and the association transfer unit, and transferring the unit cargoes to the association transfer unit and warehousing or delivering the unit cargoes.

The association transfer unit transfers the unit cargoes piled up for the warehousing or delivery to the distribution transfer unit along the moving path generated by the control unit.

The control unit generates the moving path using an optimization algorithm. Furthermore, the control unit controls the warehousing and delivery of the unit cargoes in parallel simultaneously.

The plate unit is designed in the form of a module having fastening structures on sides and extended by additionally connecting the module.

Furthermore, the plate unit is capable of arranging, moving or flat keeping the unit cargoes on the plate unit.

The distribution transfer unit is capable of rotatably moving or straightly moving the unit cargoes received from the association transfer unit on the plate unit or the association transfer unit.

The horizontal moving unit horizontally moves the plate unit.

The distribution transfer unit and the association transfer unit are capable of being located on both sides of the plate unit in order to receive the unit cargoes from the plate unit.

Advantageous Effects

In accordance with the present invention, there is an effect in that cargoes can be processed integrally and efficiently by moving unit cargoes along an optimized moving path using an optimization algorithm in association with the existing system within a warehouse.

Furthermore, there are effects in that productivity can be improved and costs can be reduced through transfer automation without using a forklift by manpower and other unit cargo transfer means.

DESCRIPTION OF REFERENCE NUMERALS

Figure 1:
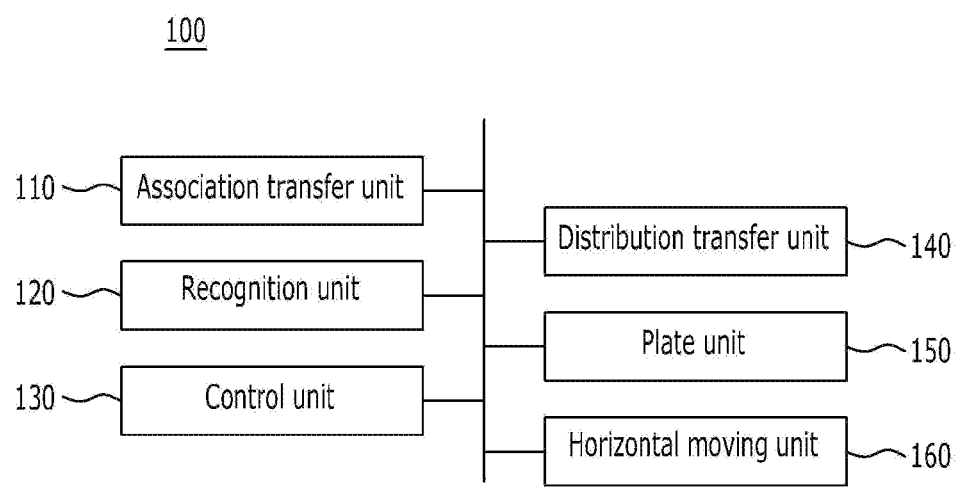
FIG. 1 shows the configuration of a logistics movement automation system 100 according to an embodiment of the present invention.

100: logistics movement automation system
110: association transfer unit 120: recognition unit
130: control unit 140: distribution transfer unit
150: plate unit 160: horizontal moving unit

MODE FOR INVENTION

Hereinafter, a logistics movement automation system and method according to embodiments of the present invention are described in detail with reference to the accompanying drawings. Embodiments to be described are provided in order for those skilled in the art to easily understand the technical spirit of the present invention, and the present invention is not restricted by the embodiments.

Furthermore, contents represented in the accompanying drawings have been diagrammed in order to easily describe the embodiments of the present invention, and the contents may be different from drawing forms that are actually implemented. Elements to be described herein are only examples for implementing the embodiments of the present invention. Accordingly, in other implementations of the present invention, different elements may be used without departing from the spirit and scope of the present invention.

Furthermore, an expression that some elements are "included" is an expression of an "open type", and the expression simply denotes that the corresponding elements are present, but should not be construed as excluding additional elements.

Furthermore, expressions, such as "the first" and "the second", are used to only distinguish between a plurality of elements from one another and do not limit the sequence or other characteristics of the elements.

When it is described that one part is "connected" to the other part, it means one part is "directly connected" to the other part or is "indirectly connected" to the other part with another part therebetween. Furthermore, when it is described that any part "includes" any element, it means the part may further include other elements unless otherwise described without excluding other elements.

FIG. 1 shows the configuration of a logistics movement automation system 100 according to an embodiment of the present invention.

Referring to FIG. 1, the logistics movement automation system 100 includes an association transfer unit 110, a recognition unit 120, a control unit 130, a distribution transfer unit 140, a plate unit 150, and a horizontal moving unit 160.

When unit cargoes are pi led up for cargo warehousing from the outside of a warehouse or for cargo delivery from an association system within the warehouse, the association transfer unit 110 transfers the unit cargoes to the distribution transfer unit 140 along a moving path generated by the control unit 130.

In this case, the unit cargo refers to a cargo packaged in a specific size or contained in a container for transfer or storage. Hereinafter, a cargo in a pallet unit is described an example, but the present invention is not limited thereto. The association transfer unit 110 may use a roller conveyer method, a belt conveyer method and a chain conveyer method, and may be differently configured depending on an object, environment and cost of a system. Furthermore, an apparatus or system associated for the warehousing and delivery of a unit cargo (hereinafter referred to as a "pallet unit cargo") includes a forklift, a hand jack, an unmanned guide vehicle, an automated storage/retrieval system (AS/AR), a distribution automation system and a loading/unloading automation system.

The recognition unit 120 recognizes that the pallet unit cargoes are piled up on the association transfer unit 110, generates recognition information based on the size, weight, shape, contents and precautions of the pallet unit cargoes, and transfers the recognition information to the control unit 130. The recognition unit 120 may recognize the pallet unit cargoes using a camera, infrared light, ultrasonic rays, an RFID and other sensors and generate the recognition information.

After receiving the recognition information from the recognition unit 120, the control unit 130 assigns priority to the pallet unit cargoes by taking into consideration a warehousing/delivery sequence, a dock or rack distribution and congestion, and generates a pallet unit cargo moving path based on the priority using an optimization algorithm. Furthermore, the control unit 130 moves the pallet unit cargoes along the generated moving path by controlling the association transfer unit 110, the distribution transfer unit 140, the plate unit 150 and the horizontal moving unit 160, and may control the warehousing and delivery of the pallet unit cargoes in parallel at the same time. In this case, if the control unit 130 controls the warehousing and delivery of the pallet unit cargoes in parallel, when the pallet unit cargoes are piled up on the association transfer unit 110 for warehousing from the outside of a warehouse and delivery from an association system within the warehouse, the control unit 130 may move the pallet unit cargoes at the same time along a moving path generated by the control unit 130. For example, when a vehicle on which pallet unit cargoes have been loaded reaches a warehouse, the control unit may unload the pallet unit cargoes from the vehicle, may control the pallet unit cargoes by performing at least one of movement, distribution, arrangement and flat-keeping for warehousing, and simultaneously may pick the pallet unit cargoes in order to upload the pallet unit cargoes stored in a rack onto the vehicle and control the pallet unit cargoes by performing at least one of movement, distribution, arrangement or flat-keeping for delivery.

The optimization algorithm means an algorithm for minimizing the number of times that pallet unit cargoes can move or an algorithm for optimizing a moving path pattern combination of pallet unit cargoes (or logistics). For example, the optimization algorithm may generate a path along which pallet unit cargoes move from the source to the destination using the A* algorithm, the Dijkstra algorithm or the Floyd algorithm. In this case, for the purpose of delivery, the control unit 130 may receive recognition information of the pallet unit cargoes and generate a moving path based on a delivery sequence, an examination sequence, a dock distribution and congestion. For the purpose of warehousing, the control unit 130 may generate a moving path based on a warehousing sequence, an examinat ion sequence, a rack distribution, arrangement and flat-keeping. Furthermore, the control unit 130 may control integrated task scheduling for the warehousing and delivery of the pallet unit cargoes in association with the existing system within a warehouse.

The distribution transfer unit 140 may distribute the pallet unit cargoes to the association transfer unit 110 or the plate unit 150 by rotatably moving or straightly moving the pallet unit cargoes. In this case, if the pallet unit cargoes are moved, the distribution transfer unit 140 may rotate and move the pallet unit cargoes up to 360 degrees. The distribution transfer unit 140 may use a turntable method and a Mecanum wheel method and may be differently configured depending on an object, environment and cost of a system.

The plate unit 150 may arrange, moves or flat keep the pallet unit cargoes on the plate unit 150 along the moving path generated by the control unit 130. In this case, the arrangement means that the pallet unit cargoes are sequentially arranged on the plate unit 150 by taking into consideration a dock distribution according to the destination and an uploading sequence according to the size of the pallet unit cargoes. The flat-keeping means that the pallet unit cargoes are kept on the plate unit 150. Furthermore, the plate unit 150 is designed in the form of a module having fastening structures on the sides and extended by additionally connecting the modules, and may be extended or reduced according to an application volume and range. In this case, in a method of fixing the plate unit 150 to the side in order to extend the plate unit 150, fixing and separation may be facilitated using a shacked or ring. The plate unit 150 may use a chain belt method, a cross belt method and a Mecanum wheel method, and may be differently configured depending on an object, environment and cost of a system and may be differently configured depending on a fastening structure and method and situation. In order to move the pallet unit cargoes on the plate unit 150 to an adjacent plate unit 150, the pallet unit cargoes need to pass through the distribution transfer unit 140 and a marginal space for the pallet unit cargoes must be present in the plate unit 150, that is, a moving destination. In this case, if the pallet unit cargoes are to be moved to the adjacent plate unit 150, the reason why the pallet unit cargoes pass through the distribution transfer unit 140 is to improve productivity for warehousing and delivery by minimizing the complexness of a moving path by reducing a factor that must be taken into consideration when the pallet unit cargoes move. The horizontal moving unit 160 may horizontally move the plate unit 150. In order to precisely move the plate unit 150, the horizontal moving unit 160 may use location-based information such as GPSs, and may use a monorail method, a chain belt method and a magnetic levitation method. If the monorail method is used, the plate unit 150 may be moved by disposing wheels or rollers at the bottom of the plate unit 150.

Box unit cargoes in addition to the pallet unit cargoes may be arranged, moved, classified or flat kept for warehousing and delivery in association with the existing system within a warehouse as described above.

Figure 2:
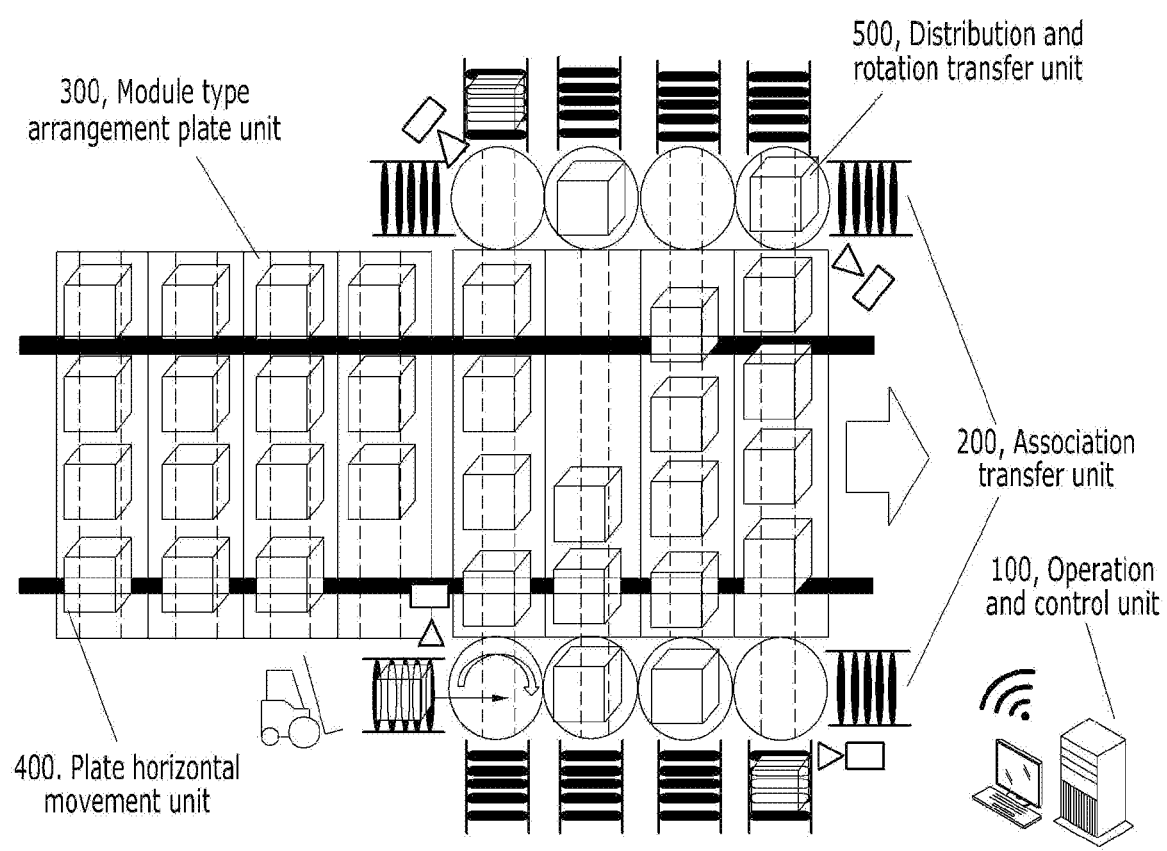
FIG. 2 shows the structure of the logistics movement automation system 100 according to an embodiment of the present invention.

FIG. 2 shows the structure of the logistics movement automation system 100 according to an embodiment of the present invention.

Referring to FIG. 2, if pallet unit cargoes are piled up on the association transfer unit 110 from the outside of a warehouse for warehousing or from the existing system within the warehouse for delivery, the recognition unit 120 recognizes the pallet unit cargoes, generates recognition information based on the size, weight, shape, contents and precautions of the pallet unit cargoes, and transfers the pallet unit cargoes to the control unit 130. After receiving the recognition information, the control unit 130 assigns priority to the pallet unit cargoes by taking into consideration a warehousing/delivery sequence, a dock or rack distribution and congestion, and generates the moving path of the pallet unit cargoes based on the priority using an optimization algorithm in which the entire warehouse system is taken into consideration. Thereafter, the control unit 130 moves the pallet unit cargoes through at least one of the association transfer unit 110, the distribution transfer unit 140 and the plate unit 150 along the generated moving path. In this case, the pallet unit cargoes may be moved from the association transfer unit 110 to the plate unit 150 via the distribution transfer unit 140 or may be moved to adjacent another association transfer unit 110. If the pallet unit cargoes are moved to the plate unit 150, it may be arranged, moved or flat kept on the plate unit 150. In order for the pallet unit cargoes to be moved to an adjacent plate unit 150, it must pass through the distribution transfer unit 140. The plate unit 150 may be moved by the horizontal moving unit 160 in the state in which the pallet unit cargoes have been arranged or flat kept. When the pallet unit cargoes reach the final destination along the moving path, it is transferred to an association system outside a warehouse or within a warehouse, such as an automated storage/retrieval system (AS/AR) via the distribution transfer unit 140 and the association transfer unit 110, thereby completing warehousing or delivery. The distribution transfer unit 140 and the association transfer unit 110 may be located on both sides of the plate unit 150 in order to receive the pallet unit cargoes from the plate unit 150, and may perform a movement or distribution. For example, upon performing warehousing, when the pallet unit cargoes are piled up on the association transfer unit 110, they may be arranged or flat kept on the plate unit 150 via the distribution transfer unit 140 or may be distributed or moved through the distribution transfer unit 140 and the association transfer unit 110 on the opposite side and warehoused in a rack. Upon performing delivery, when the pallet unit cargoes are piled up on the association transfer unit 110, they may be arranged or temporarily flat kept on the plate unit 150 via the distribution transfer unit 140, may be distributed or moved through the distribution transfer unit 140 and the association transfer unit 110 on the opposite side, may be uploaded onto a vehicle, and may be delivered.

Figure 3:
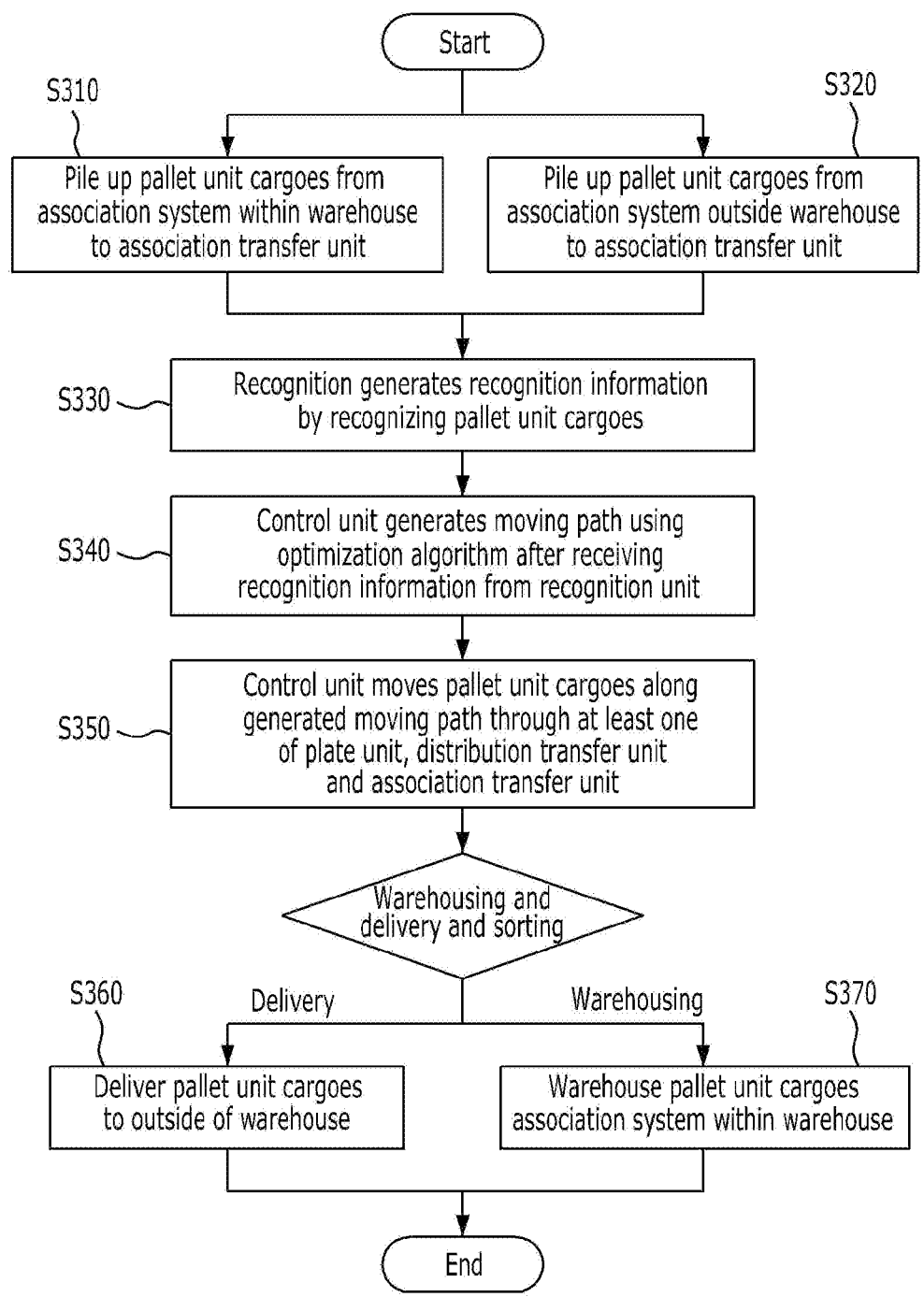
FIG. 3 is a flowchart of a movement automation method for cargo warehousing and delivery according to an embodiment of the present invention.

FIG. 3 is a flowchart of a movement automation method for cargo warehousing and delivery according to an embodiment of the present invention.

Referring to FIG. 3, in a movement automation method for the delivery of pallet unit cargos, when pallet unit cargoes are piled up from an association system within a warehouse, such as an automated storage/retrieval system (AS/AR), to the association transfer unit 110 (S310), the recognition unit 120 generates recognition information by recognizing the pallet unit cargoes and (S330). The control unit 130 may receive the recognition information from the recognition unit 120, may generate a moving path using an optimization algorithm (S340), and may move the pallet unit cargoes along the generated moving path through at least one of the plate unit 150, the distribution transfer unit 140 and the association transfer unit 110 (S350) or may arrange, distribute or flat keep the pallet unit cargoes. In this case, after receiving the recognition information, the control unit 130 may assign priority to the pallet unit cargoes by taking into consideration a delivery sequence, a dock distribution and congestion and generate a moving path for delivery based on the priority. Thereafter, when the pallet unit cargoes reach the final destination along the moving path, the control unit delivers the pallet unit cargoes to the outside of the warehouse (S360).

In a movement automation method for the warehousing of pallet unit cargoes, when pallet unit cargoes are piled up from the outside of a warehouse to the association transfer unit 110 through an unloading automation system (S320), the recognition unit 120 generates recognition information by recognizing the pallet unit cargoes (S330). The control unit 130 may receive the recognition information from the recognition unit 120, may generate a moving path using an optimization algorithm (S340), and may move the pallet unit cargoes along the generated moving path through at least one of the plate unit 150, the distribution transfer unit 140 and the association transfer unit 110 (S350) or may arrange, distribute or flat keep the pallet unit cargoes. In this case, after receiving the recognition information, the control unit may assign priority to the pallet unit cargoes by taking into consideration a warehousing sequence, a rack distribution, and arrangement and flat-keeping, and may generate a moving path for warehousing based on the priority. Thereafter, when the pallet unit cargoes reach the final destination along the moving path, the control unit transfers the pallet unit cargoes to an association system within the warehouse and warehouses them in the association system (S370).

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

The invention claimed is:

1. A logistics movement automation system, comprising:
an association transfer unit configured to transfer a plurality of unit cargoes piled up for warehousing or delivery the plurality of unit cargoes along a moving path;
a recognition unit configured to recognize the plurality of unit cargoes piled up on the association transfer unit and generate recognition information on the plurality of unit cargoes piled up on the association transfer unit;
a plate unit configured to arrange the plurality of unit cargoes thereon and move the arranged plurality of unit cargoes along the moving path; and
a distribution transfer unit configured to receive the plurality of unit cargoes from the association transfer unit or the plate unit and move the plurality of unit cargoes received from the association transfer unit to the plate unit or the association transfer unit in accordance with the moving path;
a horizontal moving unit configured to horizontally move the plate unit along the moving path; and
a control unit configured to receive the recognition information from the recognition unit and generate, based on the received recognition information, the moving path by combining the association transfer unit, the plate unit, the distribution transfer unit, and the horizontal moving unit.

2. The logistics movement automation system of claim 1, wherein the control unit generates the moving path using an optimization algorithm.

3. The logistics movement automation system of claim 1, wherein the control unit controls the warehousing and delivery of the unit cargoes in parallel simultaneously.

4. The logistics movement automation system of claim 1, wherein the plate unit is designed in a form of a module having fastening structures on sides and extended by additionally connecting the module.

5. The logistics movement automation system of claim 1, wherein the distribution transfer unit and the association transfer unit are located on both sides of the plate unit in order to receive the unit cargoes from the plate unit.

6. A movement automat ion method for cargo warehousing or delivery, comprising:
piling up a plurality of unit cargoes on an association transfer unit;
generating, by a recognition unit, recognition information by recognizing the unit cargoes;
generating, by a control unit, a moving path using the recognition information received from the recognition unit;
moving the unit cargoes along the moving path generated by the control unit through at least one of
a plate unit configured to arrange the plurality of unit cargoes thereon and move the arranged plurality of unit cargoes along the moving path,
a distribution transfer unit configured to receive the plurality of unit cargoes from the association transfer unit or the plate unit and move the plurality of unit cargoes received from the association transfer unit to the plate unit or the association transfer unit in accordance with the moving path,
a horizontal moving unit configured to horizontally move the plate unit along the moving path, and
the association transfer unit configured to transfer the plurality of unit cargoes piled up for warehousing or delivery the plurality of unit cargoes along the moving path; and
transferring the plurality of unit cargoes to the association transfer unit and warehousing or delivering the unit cargoes.

7. The method of claim 6, wherein the association transfer unit transfers the unit cargoes piled up for the warehousing or delivery to the distribution transfer unit along the moving path generated by the control unit.

8. The method of claim 6, wherein the control unit generates the moving path using an optimization algorithm.

9. The method of claim 6, wherein the control unit controls the warehousing and delivery of the unit cargoes in parallel simultaneously.

10. The method of claim 6, wherein the plate unit is designed in a form of a module having fastening structures on sides and extended by additionally connecting the module.

11. The method of claim 6, wherein the plate unit is capable of arranging, moving or flat keeping the unit cargoes on the plate unit.

12. The method of claim 6, wherein the distribution transfer unit is capable of rotatably moving or straightly moving the unit cargoes received from the association transfer unit on the plate unit or the association transfer unit.

13. The method of claim 6, wherein the distribution transfer unit and the association transfer unit are capable of being located on both sides of the plate unit in order to receive the unit cargoes from the plate unit.

\* \* \* \* \*